N. Reed.
Cotton-Seed Planter.
No. 90,722. Patented Jan. 1, 1869.
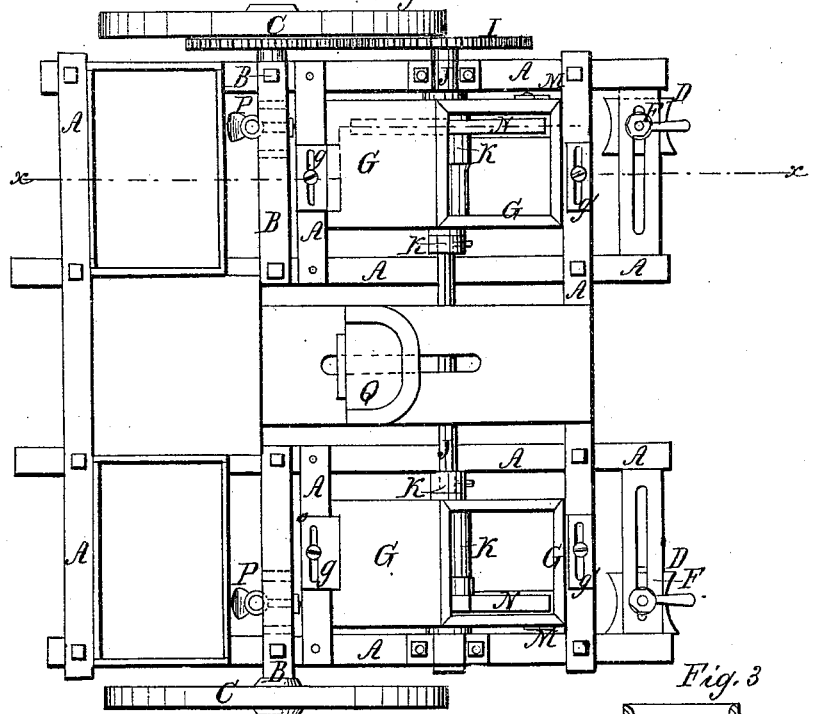
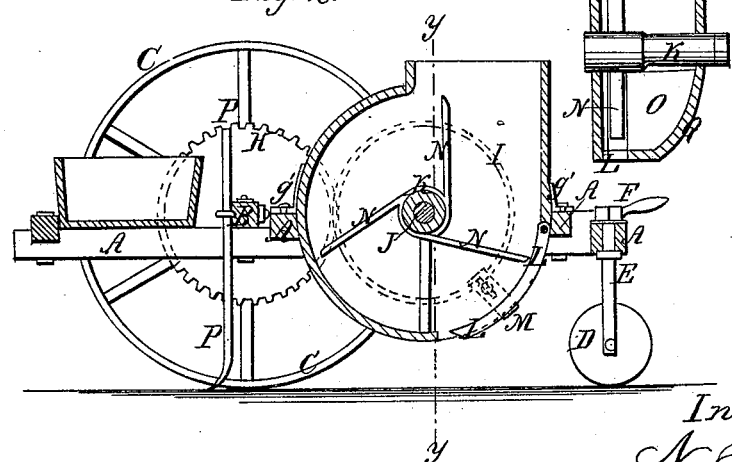
Witnesses
Jno. H. Brooks
Geo. W. Mabee
Inventor
N. Reed
per Munn & Co
Attorneys

United States Patent Office.

NATHAN BREED, OF JEFFERSONVILLE, INDIANA.

Letters Patent No. 90,722, dated June 1, 1869.

IMPROVEMENT IN COTTON-SEED PLANTER.

The Schedule referred to in these Letters Patent and making part of the same.

To all whom it may concern:

Be it known that I, NATHAN BREED, of Jeffersonville, in the county of Clarke, and State of Indiana, have invented a new and useful Improvement in Cotton-Seed Planter; and I do hereby declare that the following is a full, clear, and exact description thereof, which will enable others skilled in the art to make and use the same, reference being had to the accompanying drawing, forming part of this specification, in which—

Figure 1 is a top plan view of my improved cotton-seed planter.

Figure 2 is a detail sectional view of the same, taken through the line x–x, fig. 1.

Figure 3 is a detail sectional view of one of the seed-hoppers, taken through the line y–y, fig. 2.

Similar letters of reference indicate corresponding parts.

My invention has for its object to furnish an improved cotton-seed planter, which shall be simple in construction and effective in operation; and It consists in the construction and combination of various parts of the machine, as hereinafter more fully described.

A represents the frame of the machine, the forward part of which is attached to and rides upon the axle B of the machine, upon the journals of which the wheels C work. If desired, the wheels C may be rigidly attached to the axle B, so as to carry the said axle with them in their revolution.

The rear part of the frame A is supported by the rollers D, the faces of which are concaved, as shown in fig. 1, and which are pivoted to the yokes E, the lower parts, or stems of which pass up through slots in the frame A, and have screw-threads cut upon them, to receive the hand-nuts F, by means of which the said yokes are adjustably secured in proper position to press down the soil upon the seed.

G are the seed-boxes, or hoppers, which are adjustably secured to the frame A by screws or bolts, which pass through slots in the flanges g, formed upon or attached to the said seed-boxes, and into or through the frame A, so that the said boxes may be moved toward or from each other, according as the rows are to be planted nearer to or further from each other.

To the side of one of the wheels C is attached, or upon it is formed a gear-wheel, H, the teeth of which mesh into the teeth of the gear-wheel I, attached to the end of the shaft J, which revolves in bearings attached to the frame A, and which passes through the middle parts of the seed-boxes G, as shown in figs. 1, 2, and 3.

Upon the parts of the shaft J that pass through the seed-boxes G, are placed sleeves K, which are adjustably secured to said shaft by pins, keys, or other well-known means, so that the positions of said sleeves may be adjusted according to the adjustment of the seed-boxes G.

If desired, the hoppers G may be placed over the axle B, and the sleeves K may be secured to said axle. This latter construction is preferred in the case of single-row planters, and may be used upon double-row planters.

The bottom of the seed-box G is slotted, and in the slot thus formed is placed a slat, or door, L, the upper end of which is hinged to the seed-box G, in the upper end of the slot formed in the bottom of said box.

The lower end of the hinged door, or bottom, L, is supported by an arm, or keeper, M, which passes beneath said lower end of the said door L, and which extends up along the side of the seed-box G, where it is adjustably secured in place by a screw or bolt, passing through a slot in said arm, or keeper, and screwing into the side of the said seed-box, so that the bottom, L, may be adjusted to open or close the opening through the bottom of the seed-box wholly or to any desired extent.

To the sleeves K are attached arms N, which, as the machine is drawn forward, sweep through the seed-boxes G, and force the cotton-seed out through the openings in the bottoms of said boxes.

To the sides of the lower part of the interior of the seed-box G are attached two scrapers, O, extending up nearly to the sleeve K, and which are placed just above the lower, or forward end of the opening through the bottom of said seed-box.

The arms N, as they revolve, pass through the space between the scrapers O, so that all lint or seed that may adhere to them may be scraped off and allowed to pass out through the opening in the bottom of said box, thus preventing the said arms or seed-box from becoming choked or clogged.

P are the plows that open the ground to receive the seed, and which are adjustably secured to the frame A, as shown in fig. 1, so that their position may be adjusted according to the adjustment of the seed-boxes G.

Q is the driver's seat, which is adjustably secured to the platform of the machine, so that its position may be adjusted according as it is desired to have the driver's weight bear more or less upon the rollers D.

Having thus described my invention,

What I claim as new, and desire to secure by Letters Patent, is—

1. The adjustable seed-box or boxes G, constructed with an adjustable-hinged bottom, L, substantially as herein shown and described, and for the purpose set forth.

2. The adjustable sleeve or sleeves K, provided with arms, or teeth N, in combination with the seed-box or boxes G, and axle or shaft, from which they receive motion, substantially as herein shown and described, and for the purpose set forth.

3. The scrapers O, in combination with the seed-box G and arms N, substantially as herein shown and described, and for the purpose set forth.

NATHAN BREED.

Witnesses:
JOHN S. HALL,
WM. SEMPLE.